V. H. DISNEY.
POULTRY RELEASING DEVICE.
APPLICATION FILED NOV. 24, 1917.
1,317,559.
Patented Sept. 30, 1919.
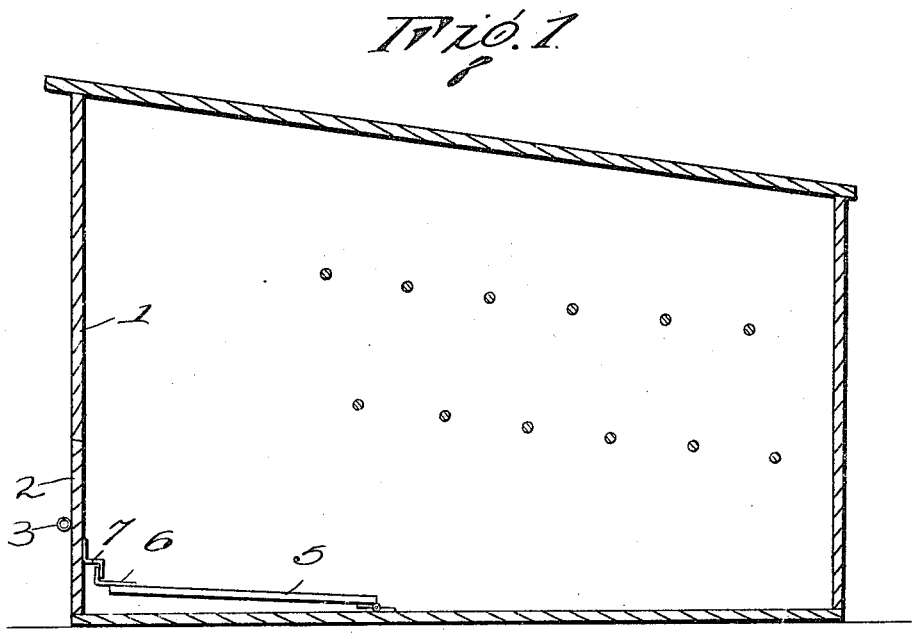
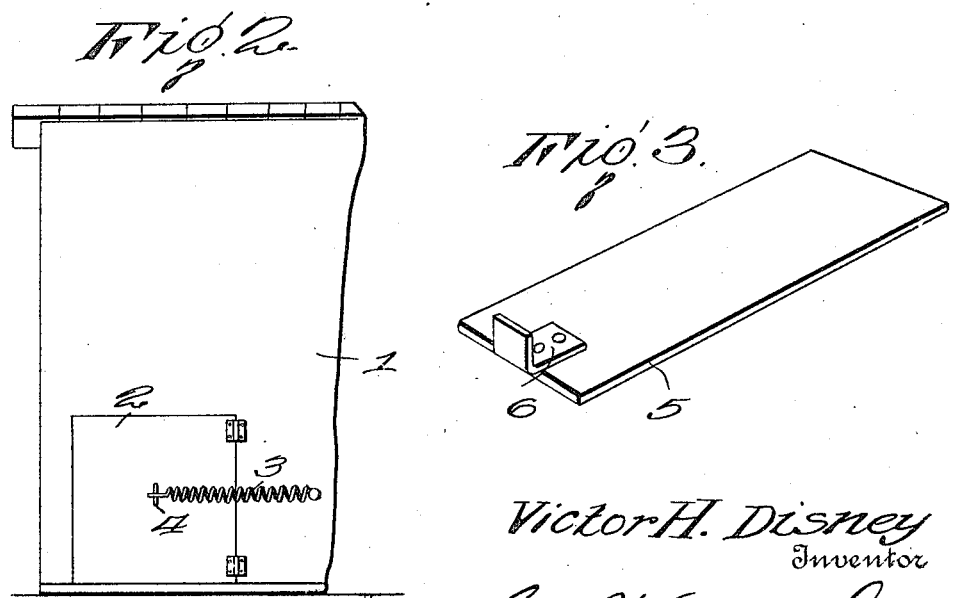
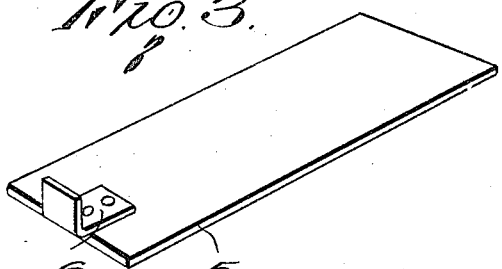
Victor H. Disney
Inventor
By Geo. P. Kimmel
Attorney

UNITED STATES PATENT OFFICE.

VICTOR H. DISNEY, OF VASPER, TENNESSEE.

POULTRY-RELEASING DEVICE.

1,317,559.  Specification of Letters Patent.  Patented Sept. 30, 1919.

Application filed November 24, 1917. Serial No. 203,707.

*To all whom it may concern:*

Be it known that I, VICTOR H. DISNEY, a citizen of the United States, residing at Vasper, in the county of Campbell and State of Tennessee, have invented certain new and useful Improvements in Poultry-Releasing Devices, of which the following is a specification.

This invention relates to poultry husbanding devices and it is the principal object of the invention to provide an improved fowl releasing means, whereby the door of a poultry house will be automatically opened upon movement of the fowls from their roosts, thereby avoiding the necessity of manually releasing the same.

Among other aims and objects of the invention may be recited, the provision of a device of the character mentioned with a view to compactness, and in which the number of parts are few, the construction simple, the cost of production small, and efficiency and operation high.

Other objects will be in part obvious and in part pointed out hereinafter.

The improvements in the details and arrangements of parts will be apparent from an inspection of the accompanying drawings, in connection with the specific description hereinafter contained, and wherein the preferred embodiment of the invention is disclosed for the purpose of imparting a full understanding of the same.

In the drawings:—

Figure 1 is a vertical section through a poultry house having the invention applied to the door thereof, Fig. 2 is a fragmental elevation of the same, and, Fig. 3 is a detail in perspective of the platform and catch.

Having more especial reference to the drawings and in connection with which like reference characters will designate corresponding parts throughout the several views thereof, 1 represents the poultry house in its entirety, the same being provided with a door 2 serving for an obvious purpose. As means for causing the door to be moved to open position immediately subsequent to the release of the same, a contractile coil spring 3 is provided and has one end of the same engaged with the door as at 4 while the other end is engaged with the adjacent wall of the house.

Hingedly secured to the flooring of the housing 1 is a light platform 5 carrying a catch 6 upon its free end, which catch is adapted to be engaged with a complemental catch 7 secured to the inner side of the door 2. Thus, it will be readily understood, that when the catch 6 is engaged with the catch 7 the door 2 will be maintained in closed position against tension of the contractile spring 3. However, when the platform 5 is subjected to the weight of a fowl or fowls the same will be moved downwardly, thereby disengaging the said catch elements and permitting the door 2 to be swung open by reason of its engagement with the spring 3.

From the foregoing, it will be readily appreciated by workers skilled in the art that I have provided an exceedingly simple and efficient fowl releasing device and further, a construction which will eliminate considerable work upon part of the poultry owner. Subsequent to the housing of the poultry at night, the catch 6 carried by the platform 5 may be engaged with the catch 7 on the door 2 and the said door thus maintained in its closed position. The person after closing the door and engaging the catch elements 6 and 7 may of course leave by the larger door, such as is ordinarily provided in poultry houses. However, it should be noted that the catches 6 and 7 can be engaged only by the raising of the platform 5 upwardly and in consequence, the locking of the door by merely swinging the same to its closed position will be prevented, thus, preventing the accidental or undesired locking of the same and allowing the poultry access to the house, at all times, except when the door is purposely locked by a person. In the morning upon movement of the fowls from their roosts and engagement with the platform 5, the catch elements 6 and 7 will be immediately disengaged and the door 2 permitted to swing to full open position, thus releasing the fowls.

Manifestly, the construction shown is capable of considerable modification and such modification as is within the scope of my claim, I consider within the spirit of my invention.

I claim:—

The combination with an inclosure having a door swingingly supported for horizontal movement, a platform arranged interiorly of the inclosure and located contiguous to the door opening, hinges swingingly connecting the platform at its rear end to the bottom of the inclosure, an L-shaped catch mounted on the other end of the platform, a substantially Z-shaped keeper mounted on the inner face of the door spaced from the lower edge thereof and adapted to engage the catch on the platform when the door is closed, and a tension spring connected to the inclosure exteriorly thereof and also to the outer face of the door for tensioning said door when in closed position and the keeper thereon is engaged with the catch on the platform to sustain the said platform in rearwardly inclined position.

In testimony whereof I affix my signature hereto.

VICTOR H. DISNEY.